United States Patent

Landa et al.

Patent Number: 6,146,803
Date of Patent: Nov. 14, 2000

[54] POLYMER BLEND LIQUID TONER COMPOSITIONS

[75] Inventors: Benzion Landa, Nes Ziona; Peretz Ben-Avraham, Rehovot; Becky Bossidan, Rishon Lezion, all of Islamic Rep. of Iran

[73] Assignee: Indigo N.V., Rehovot, Israel

[21] Appl. No.: 08/203,596

[22] Filed: Feb. 28, 1994

Related U.S. Application Data

[63] Continuation of application No. 07/676,422, Mar. 28, 1991, abandoned.

[51] Int. Cl.$^7$ .................................................. G03G 9/13
[52] U.S. Cl. ........................ 430/114; 430/115; 430/137; 430/904
[58] Field of Search .................................... 430/114, 115, 430/137, 904

[56] References Cited

U.S. PATENT DOCUMENTS

| | | | |
|---|---|---|---|
| 3,863,603 | 2/1975 | Buckley et al. | 118/637 |
| 3,959,574 | 5/1976 | Seanor et al. | 428/425 |
| 4,684,238 | 8/1987 | Till et al. | 355/10 |
| 4,690,539 | 9/1987 | Radulski et al. | 355/3 TR |
| 4,845,006 | 7/1989 | Matsubara et al. | 430/99 |
| 4,957,844 | 9/1990 | Page | 430/115 |
| 4,974,027 | 11/1990 | Landa et al. | 355/256 |
| 4,990,424 | 2/1991 | Van Dusen et al. | 430/106.6 |
| 5,001,031 | 3/1991 | Yamamoto et al. | 430/109 |

FOREIGN PATENT DOCUMENTS

| | | |
|---|---|---|
| 0305524 | 3/1989 | European Pat. Off. . |
| 0373652 | 6/1990 | European Pat. Off. . |
| 890112258 | 12/1989 | WIPO . |
| 9004216 | 4/1990 | WIPO . |

OTHER PUBLICATIONS

English Abstract of Japanese Patent Document No. 63–058356.
International Search Report and Annex.

*Primary Examiner*—Bernard Codd
*Attorney, Agent, or Firm*—Greenblum & Bernstein, P.L.C.

[57] ABSTRACT

In a liquid toner for use in imaging processes which comprises pigmented polymer particles, at least one charge director and a hydrocarbon liquid toner carrier, the polymer is a blend of at least two distinct polymer components, the blend being characterized in that in a 40% non-volatile mixture with a hydrocarbon liquid toner carrier, it has on a semi-logarithmic viscosity vs. temperature cooling curve, a break-point at a temperature below about 65° C. at a viscosity of between about $3 \times 10^5$ centipoises and about $5 \times 10^6$ centipoises. The polymer blend and an electrostatic imaging process (particularly one using an intermediate transfer member) utilizing the above toner are also claimed. Use of such polymer blends enables liquid toner to be applied in such processes at no more than and in some cases less than the customary processing temperatures.

10 Claims, 6 Drawing Sheets

POLYMER BLEND LIQUID TONER COMPOSITIONS

This application is a continuation of application Ser. No. 07/676,422, filed Mar. 28, 1991, now abandoned.

FIELD OF THE INVENTION

The present invention relates to polymer blends which are useful in liquid toner compositions for imaging processes.

BACKGROUND OF THE INVENTION

Liquid toner compositions used in imaging processes generally comprise pigmented polymeric particles, a carrier liquid and charge director. Certain imaging processes use intermediate transfer members which receive an image from the photoconductor and transfer it to the final substrate, e.g. paper. When an intermediate transfer member (ITM) is used, the liquid toners should meet the following three criteria, namely, they should transfer well from the photoconductor to the ITM; they should transfer well from the ITM to the final substrate; and they must fuse well to the final substrate so that the image is abrasion resistant.

The transfer steps are preferably effected at as low a temperature as possible, because low temperature operations prolong the life of the ITM and the photoconductor. The liquid toners presently used in the art frequently contain Elvax® II polymers or Surlyn® polymers. While the Elvax II polymers generally transfer and fix well, some of them are too soft in the presence of carrier liquid to resist squashing during transfer to and from the intermediate transfer member. Those which do transfer and fix well require intermediate transfer member temperatures which marginally effect the operation of the photoreceptor and reduce the life of the intermediate transfer member.

In general Surlyn polymers wet paper substrates poorly and require very high temperatures for fixing on paper. These materials are, however, very hard and therefore are very abrasion resistant when they are fixed to paper at high temperatures.

SUMMARY OF THE INVENTION

In a liquid toner imaging system utilizing a photoreceptor and an intermediate transfer member (ITM), the toner image (which contains a substantial amount of carrier liquid), at the start or transfer from the ITM to a final substrate, e.g. paper, should have a relatively low viscosity (optimally about $3 \times 10^5$ to $5 \times 10^6$ centipoise) such that it flows into and wets the paper, yet on contact with the paper (whereby the toner image cools somewhat), the viscosity should substantially increase so that the image transfers completely (i.e. not splitting between the ITM and the substrate). Thus a semi-logarithmic cooling curve of viscosity vs. temperature should show a transition between a lower slope (slowly varying) portion for temperatures above the knee and a high slope portion for temperatures below the knee. The term "break-point" is used herein in the specification and claims to describe this transition. This knee should occur at or near the optimal viscosity range at as low a temperature as possible and should be as sharp as possible.

Moreover, the transferred image, while still containing a high percentage of carrier liquid, should preferably be hard, in order that an additional, fusing/fixing step in which solvent is evaporated, may be avoided.

The known Elvax II (Dupont) polymers which are useful as toner materials for example Elvax II 5650T and 5950, when in a 40% NVS (non-volatile solids content) mixture with Isopar L carrier liquid have a knee at approximately the correct viscosity at a temperature of about 60° C. Other Elvax II materials have lower break-point temperatures but their viscosity is low and they are more prone to squash than the preferred Elvax II materials.

Surlyn polymers (Dupont) (which are "ionomers" derived from ethylene/methacrylic acid copolymers), when used in liquid toners, confer excellent abrasion resistance on the image, but transfer poorly to paper and require very high ITM temperature to effect fixing to substrates.

It is an object of one aspect of the present invention to provide polymer blends which have broadly a similar range of viscosity as the Elvax II 5650T and 5950 resins, but having a break point or turning point at a lower temperature, whereby imaging processes, particularly those employing an ITM, can be conducted at relatively low temperatures. Other objects of the invention will appear from the description which follows.

The present invention accordingly provides in one aspect, a polymer blend of at least two distinct polymer components, the blend being characterized by the fact that in a 40% non-volatile mixture with a hydrocarbon liquid toner carrier, on a semi-logarithmic viscosity vs. temperature cooling curve, it has a break-point in the viscosity vs. temperature curve at a temperature below about 65° C. and viscosity between about $3 \times 10^5$ and $5 \times 10^6$ centipoise.

Preferably at least one of the polymer components does not have a break point in the preferred range.

In a preferred embodiment of the invention, one of the polymers is an ionomer derived from ethylene/methacrylic acid copolymer. One of the preferred polymers is a terpolymer preferably an acid modified ethylene vinyl acetate terpolymers. In a preferred embodiment of the invention each of the components are present in the range of between 25% and 75%.

In another aspect, the invention provides a liquid toner for use in imaging processes which comprises pigmented polymer particles, at least one charge director and a hydrocarbon liquid toner carrier, wherein the polymer comprised in the paricles is a blend of at least two distinct polymer components, the blend being characterized by the facts recited in the preceding paragraphs.

The invention further provides, in an electrostatic imaging process utilizing a liquid toner which includes pigmented polymer particles, at least one charge director and a hydrocarbon liquid toner carrier, the improvement which comprises using as the polymer comprised in the particles is a blend of at least two distinct polymer components, the blend being characterized by the facts recited in the preceding paragraphs.

There is yet further provided by the present invention, in an electrostatic imaging process utilizing a liquid toner which includes pigmented polymer particles, at least one charge director and a hydrocarbon liquid toner carrier, and in which an image formed on the surface of a photoconductor is developed by the toner, the image is transferred from the surface to an intermediate transfer member and from the intermediate transfer member to a substrate, the improvement which comprises using as the polymer comprised in the particles is a blend of at least two distinct polymer components, the blend being characterized by the facts recited in the preceding paragraphs.

DETAILED DESCRIPTION OF THE INVENTION

It has surprisingly been found in accordance with a preferred embodiment of the present invention, that blends of some Surlyn polymers with some Elvax (Dupont) terpolymers, in certain proportions, possess the viscosity/temperature characteristics of the invention, which have been recited in the above summary (the "criteria"). In particular instances, it has been found that liquid toners containing pigmented polymer particles wherein the polymer is constituted by such blends, may be used in electrostatic imaging processes at either comparable operating temperatures to those which are utilized in the case of pigmented Elvax II polymer particles, or even at advantageously lower temperature ranges.

Figure 1:
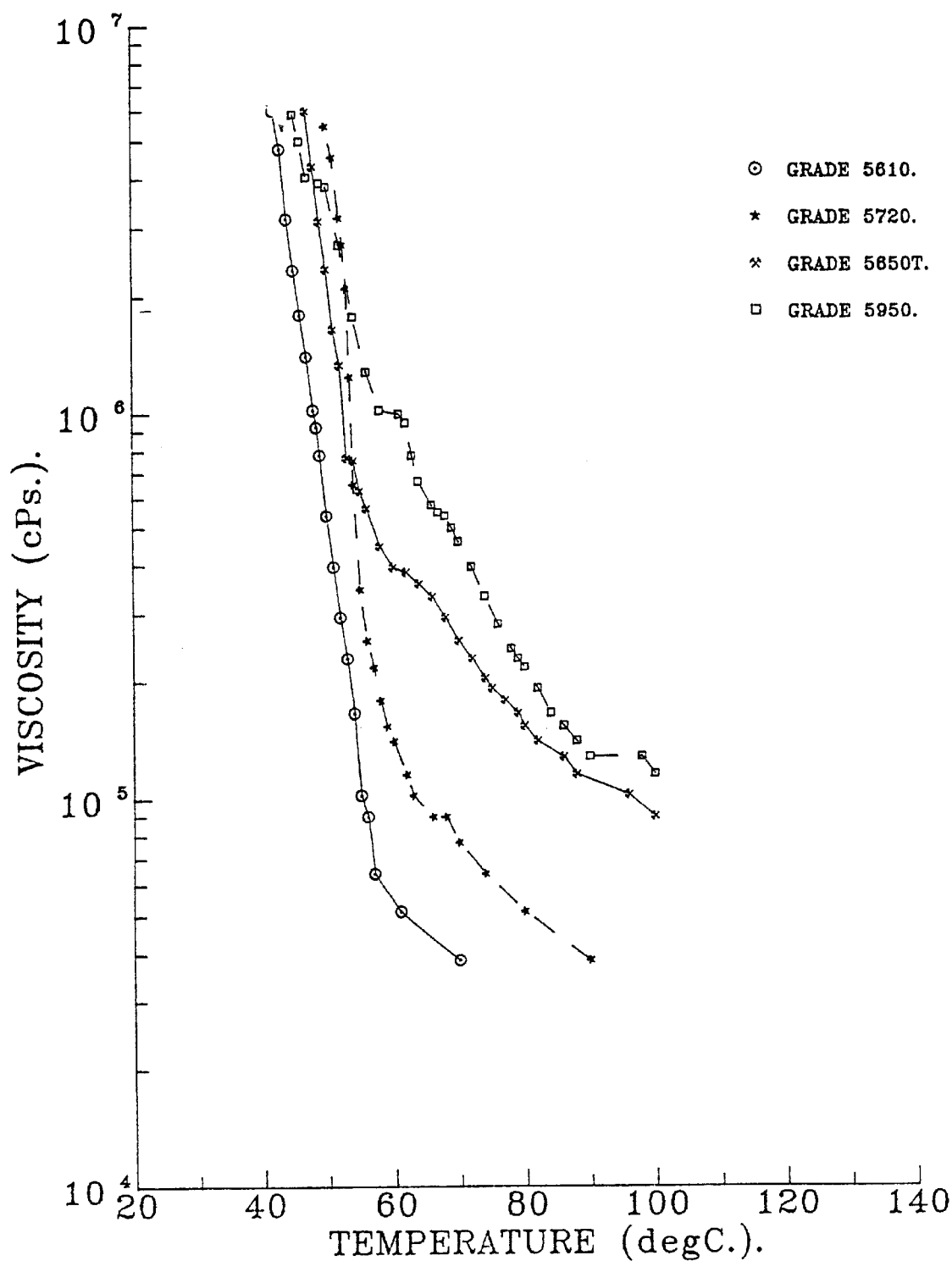
FIG. 1 shows the cooling curves of Elvax II polymers at 40% NVS in Isopar L.

FIG. 1 shows (cooling) curves of viscosity vs. temperature for various Elvax II resins in a 40% NVS (non-volatile solids) mixture with Isopar L (EXXON), an isoparaffinic hydrocarbon fraction, which is often used as a carrier liquid in liquid developers. It is estimated that 40% NVS is the approximate proportion in a liquid toner image when the image is transferred to paper.

As seen in FIG. 1 Elvax II 5650T and Elvax II 5950 resins have breakpoints within the desired range, where the break-point temperature is about 55°–65° C. and the viscosity is between $3 \times 10^5$ and $5 \times 10^6$ centipoise. While these break-points are not especially sharp, these materials are satisfactory toner polymers. Other Elvax II resins such as Elvax II 5610 and Elvax II 5720 have viscosities which are too low and in general are not preferred as toner particle resins for liquid toners.

In practice the image cools by about 10°–15° C. as it comes in contact with a final substrate and the image does not split on transfer from an intermediate transfer member to the final substrate if it cools to a temperature above the break point.

Figure 2:
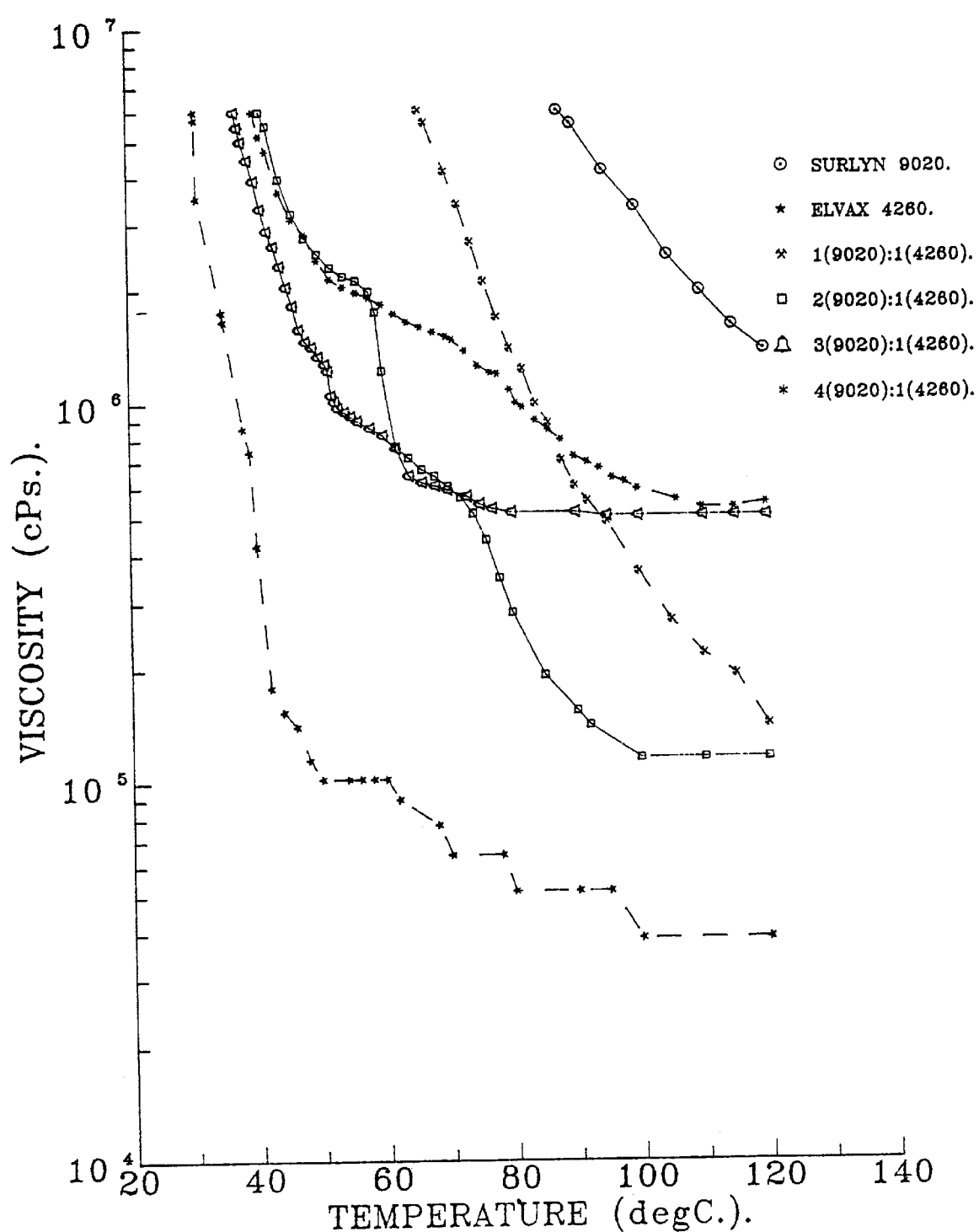
FIG. 2 shows the cooling curves of blends of Surlyn 9020 and Elvax 4260 polymers at 40% NVS in Isopar L.

FIG. 2 shows (cooling) curves of viscosity vs. temperature for various Surlyn 9020/Elvax 4260 blends. The Surlyns are ionomers derived from ethylene/methacrylic acid copolymers and the Elvaxs (as opposed to the Elvax IIs) are acid modified ethylene vinyl acetate terpolymers. Both are manufactured by Dupont corporation.

As seen in FIG. 2 both the pure Surlyn 9020 and the pure Elvax 4260 do not meet the required optimum conditions of break point temperature and viscosity. While Elvax 4260 does have a break-point at about 42° C., the viscosity at this point is very low. Surlyn 9020 does not have a break-point in the proper range and has a very high viscosity in the desired temperature range. Neither of these resins has been found to be a suitable polymer for low temperature operation in an intermediate transfer imaging system.

As can be seen from FIG. 2, blends containing 66%, 75% and 80% Surlyn 9020 do meet the criteria and are believed to be suitable for use in intermediate transfer liquid toner systems, and a blend containing 50% does not meet the criteria of the present invention.

Figure 3:
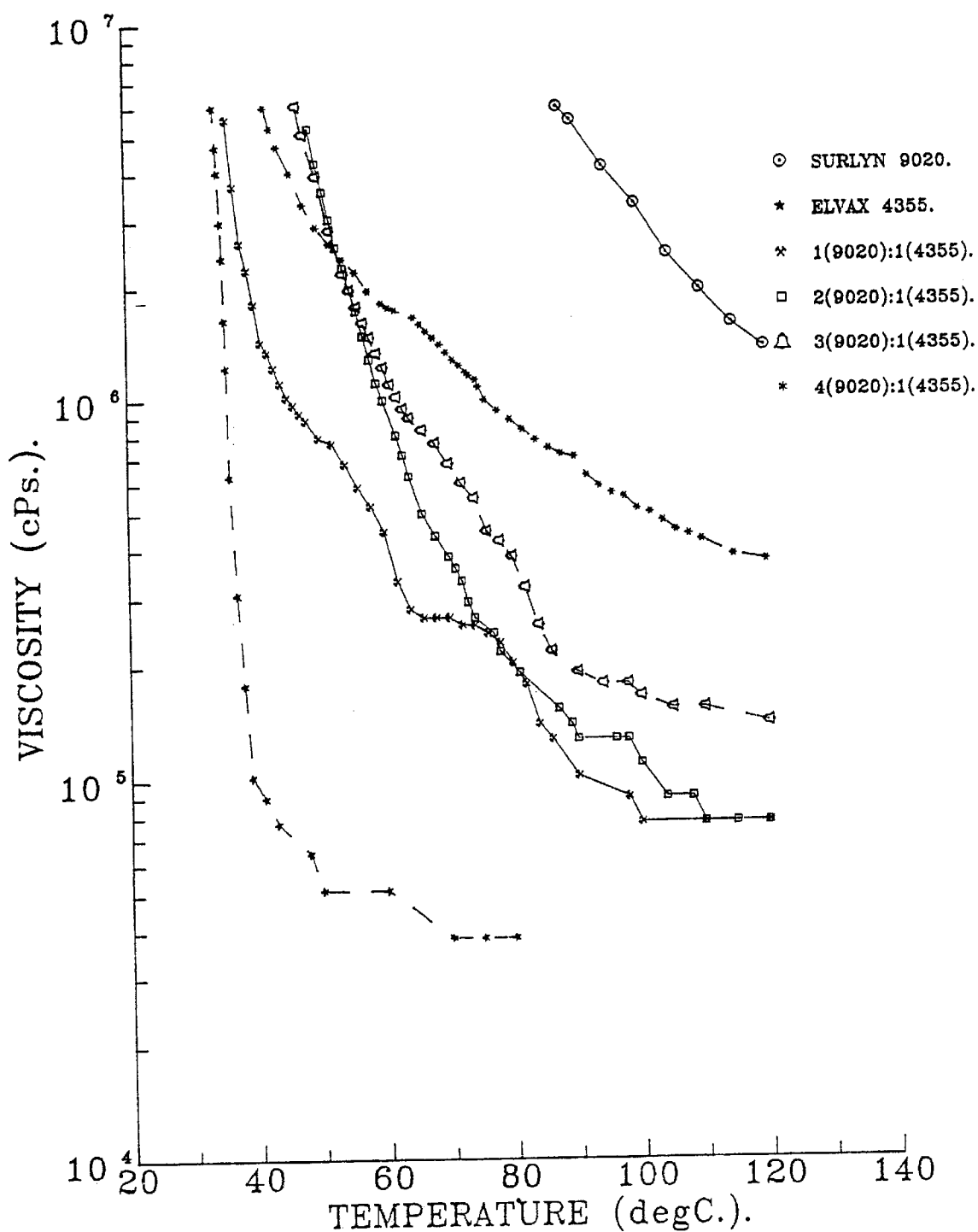
FIG. 3 shows the cooling curves of blends of Surlyn 9020 and Elvax 4355 polymers at 40% NVS in Isopar L.

FIG. 3 shows (cooling) curves of viscosity vs. temperature for various Surlyn 9020/Elvax 4355 blends. As seen in FIG. 3 the pure Elvax 4355 does not meet the required optimum conditions of break point temperature and viscosity. While Elvax 4355 does have a break-point at about 35° C. the viscosity at this point is too low. This resin has not been found to be a suitable resin for low temperature operation in an intermediate transfer imaging system.

Blends containing and 80% Surlyn 9020 do meet the criteria and are believed to be suitable for use in intermediate transfer liquid toner systems. The blend containing 50% Surlyn 9020 marginally meets the criteria and may also be suitable. The blends containing 66% and 75% Surlyn 9020 do not meet the criteria of the present invention.

Figure 4:
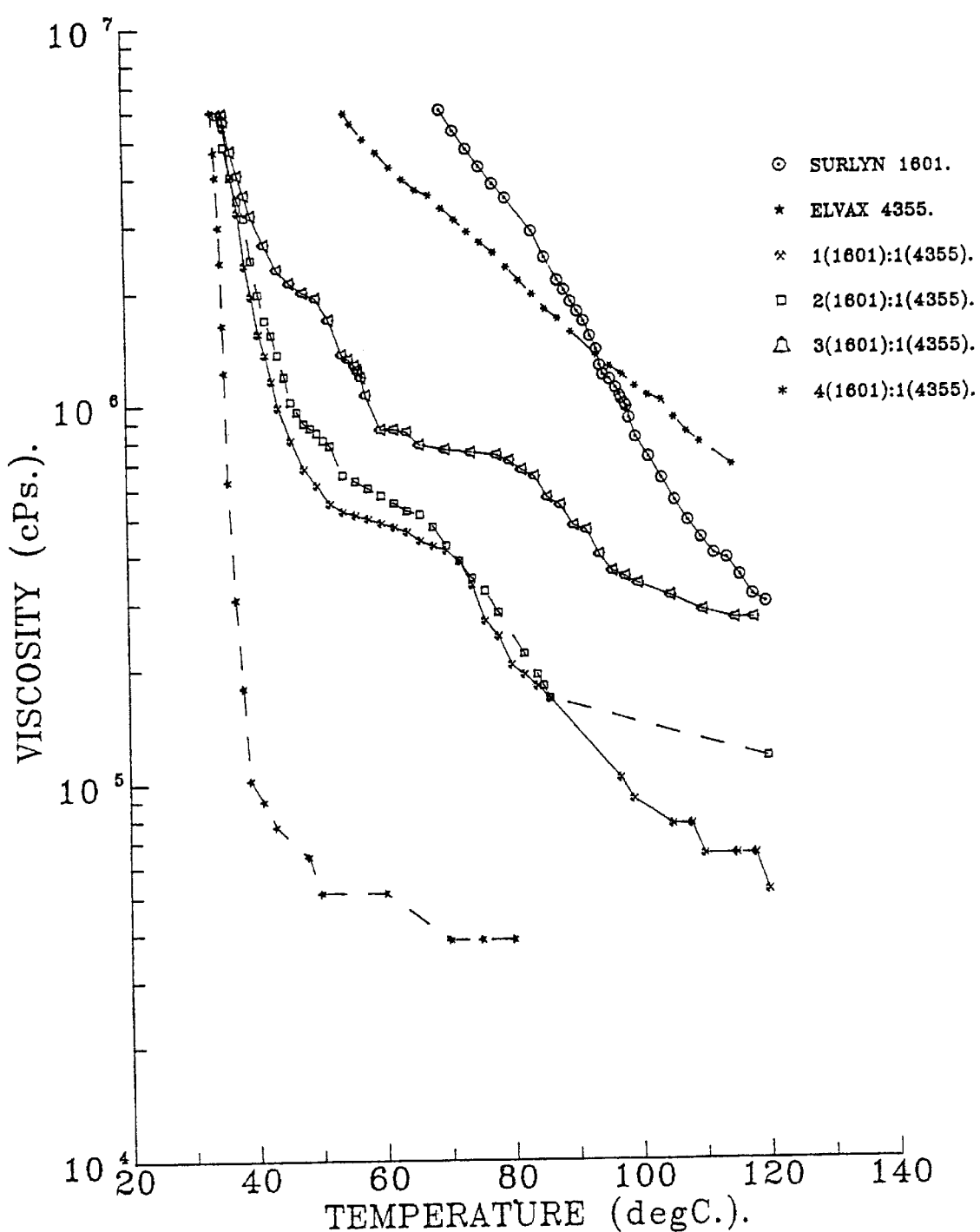
FIG. 4 shows the cooling curves of blends of Surlyn 1601 and Elvax 4355 polymers at 40% NVS in Isopar L.

FIG. 4 shows (cooling) curves of viscosity vs. temperature for various Surlyn 1601/Elvax 4355 blends. As seen in FIG. 4, the pure Surlyn 1601 does not meet the required optimum conditions of break point temperature and viscosity. Surlyn 1601 does not have a break-point in the proper range and has a very high viscosity in the desired semi-logarithmic range. This resin has not been found to be suitable as a base for toner particles used for low temperature operation in an intermediate transfer imaging system.

Blends containing between 50% and 75% Surlyn 1601 do meet the criteria and are believed to be suitable for use in intermediate transfer liquid toner systems. The 80% Surlyn blend marginally meets the criteria.

Figure 5:
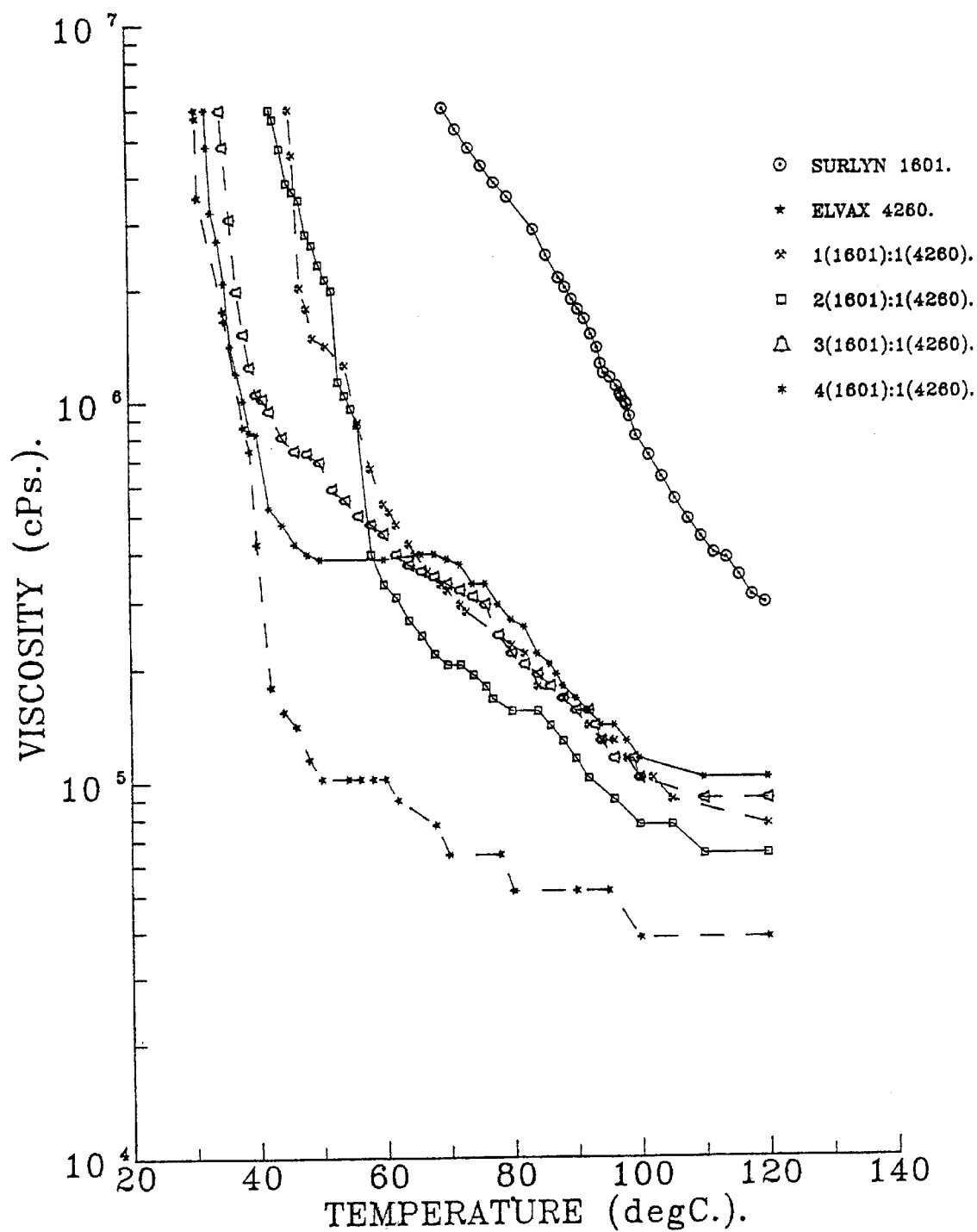
FIG. 5 shows the cooling curves of blends of Surlyn 1601 and Elvax 4260 polymers at 40% NVS in Isopar L.

FIG. 5 shows (cooling) curves of viscosity vs. temperature for various Surlyn 1601/Elvax 4260 blends.

Blends containing between 50% and 75% Surlyn 1601 do appear to meet the criteria and are believed to be suitable for use in intermediate transfer liquid toner systems.

While FIGS. 2–5 do show a certain amount of unpredictability regarding the suitability of a particular blend even when the suitability of other blend of the same materials is known. Notwithstanding this unpredictability, the skilled person can of course readily determine the viscosity/temperature relationships for any particular polymer blend in order to know whether these are such that the blend in question falls within the scope of the invention.

It will further be appreciated that persons skilled in the art may readily determine the optimal temperatures at which the polymer blends of the invention, which in liquid toners will of course be in an admixture with liquid toner carrier, pigment and charge director, may be utilized for electrostatic imaging purposes.

Liquid toner compositions of the invention which incorporate the inventive polymer blends necessarily contain organic carrier liquids, usually solvents. Typical of such solvents, which are mentioned here for illustrative purposes only, are insulating, nonpolar liquids, preferably having a resistivity in excess of about $10^9$ ohm-cm and a dielectric constant below about 3.0. These solvents are generally hydrocarbons, preferably aliphatic and more preferably isomerized aliphatic hydrocarbons, as, for example, those marketed by Exxon Corporation under such trade marks as Isopar-G, Isopar-H, Isopar-L and Isopar-M, which meet the preferred resistivity and dielectric requirements. Alternatively, other liquids having the preferred resistivity and dielectric requirements, e.g. light mineral oils, such as those manufactured by the Humble Oil and Refining Company under the trade marks Marcol 52 and Marcol 62, may be used. A further suitable solvent is marketed as "Peneteck"

(Penreco, Butler, Pa.) described by the manufacturers as a technical white mineral oil, of flash point 129° C., viscosity 38/42 (SUS at 100° F.) and 3.4/4.7 (CSTK at 40° C.) when measured according to ASTM D 445, specific gravity 0.808/ 0.818 at 60° F. and API 41.5/43.6, measured according to ASTM D 1298.

Blends of 75% Surlyn and 25% Elvax terpolymer were made up into liquid toners and used in a liquid toner imaging system incorporating an intermediate transfer member. Using these toners, a good transfer to the intermediate transfer member was obtained, as well as a good transfer from the latter to both XEROX paper and printers stock at optimal intermediate transfer member temperatures between 45° C. and 70° C., depending on the blend, with optimal temperatures for the Surlyn 9020 based toners having an optimum intermediate transfer temperature of between 45° and 50° C. and the Surlyn 1601 based materials having an optimal intermediate transfer member temperature of 60°–70° C. In this example, the image was soft in presence of carrier liquid, but good fixing was obtained by evaporation of the carrier in an additional fusing/fixing step. It is believed, however, that using other polymer blends within the scope of the invention will enable harder images to be obtained, thus avoiding the necessity for the additional fusing/fixing step.

The specific preferred toners which are disclosed herein are preferably produced as follows. 1000 grams of polymer material in the required proportions and 1000 grams of Isopar-L are mixed at low speed in a jacketed double planetary mixer connected to an oil heating unit set at 170° C. for one hour. 2000 grams of Isopar L, preheated to ≈110° C. is added to the mix and the whole is mixed for a further hour at high speed. The material is allowed to cool in the mixer until it reaches ≈70° C. at which time it is discharged from the mixer into aluminum pans. The material is cooled to room temperature and is shredded and passed through a meat grinder to produce a coarsely ground material. Approximately 1050 grams of the coarsely ground material, 66 grams of Mogus-L carbon black (Cabot) and 1200 grams of Isopar L are charged into a S1 attritor (Union Process) and milled by 3/16" carbon steel balls for 10 hours with water cooling (≈20° C.). The resultant toner particles have a median (by weight) diameter of about 2 $\mu$m. The resultant material is diluted to a non-volatile solids content of 1.5%, using Isopar L. Charge directors as known in the art are added to charge the toner particles. Preferably, the charge directors described in commonly assigned U.S. Pat. No. 5,047,306 filed May 22, 1989, or U.S. Pat. No. 5,208,130, filed on Jun. 6, 1990, the disclosures of which are incorporated herein by reference, may be used.

Figure 6:
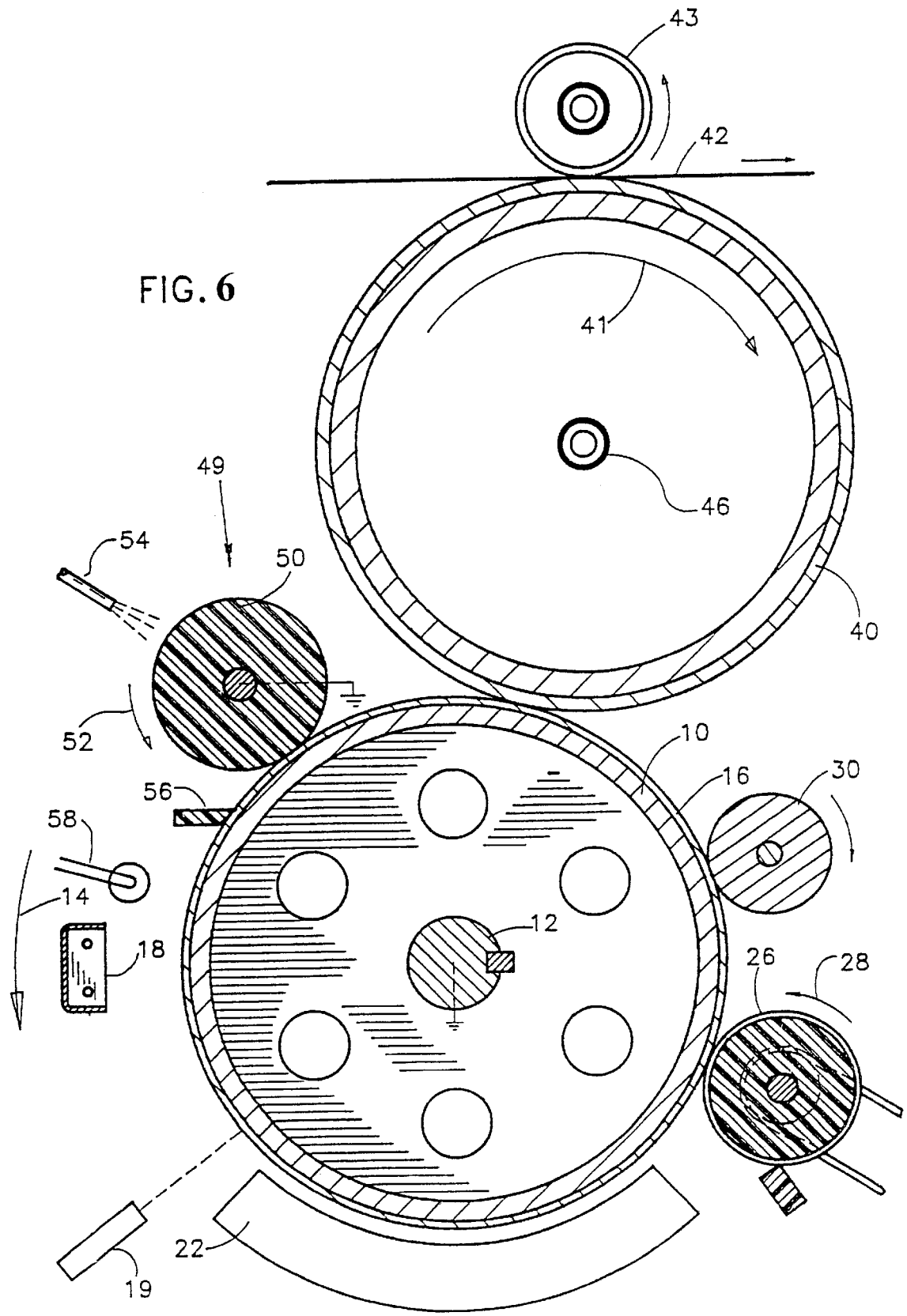
FIG. 6 illustrates an electrostatic imaging apparatus and process in which a liquid toner which includes the polymer blend of the present invention may be employed.

Reference will now be made to FIG. 6 which illustrates imaging apparatus, in which the electrostatic imaging process of the invention employing the liquid toners of the invention (including the inventive polymer blends), may be carried out. The operation of this apparatus is described in the context of liquid developer systems with negatively charged particles and positively charged photoreceptors, but the invention may also be applied to other combinations of toner charge and photoreceptor charge.

The apparatus of FIG. 6 comprises a drum 10 arranged for rotation about axle in the direction indicated by arrow 14. Drum 10 is formed with a cylindrical photoreceptor surface 16, preferably selenium based or organic photoconductors. When the apparatus is activated, drum 10 begins to rotate and a charger 18 is operative to generally uniformly charge surface 16 with a positive charge, typically of the order of 1000 volts. Continued rotation of drum 10 brings charged surface 16 into image receiving relationship with light source 19, for example a laser scanner, which projects a desired image onto charged surface 16, thereby selectively discharging this surface and producing a latent image thereon. Typically, the discharged areas of surface 16 have a voltage of 100–200 volts.

Continued rotation of drum 10 brings charged surface 16 bearing the electrostatic latent image into operative association with developer unit 22, operative to apply a liquid developer (toner) to develop the latent image. For multicolor systems, unit 22 may comprise, for example, a plurality of developers, one for each color, which are selectively engaged with the photoreceptor surface, as described e.g. in U.S. Pat. No. 4,690,539, or a single development station where the liquid toner is changed between colors, or any other suitable development system. Developer unit 22 includes apparatus (not shown) for dispensing carrier liquid, toner particles and charge director, each of which may be stored in separate dispenser cans or reservoirs.

Following application of toner thereto, surface 16 passes a typically positively charged rotating roller 26, preferably rotating in the direction indicated by arrow 28; roller 26 functions as a metering roller which reduces the thickness of liquid on surface 16. Typically, the spatial separation of roller 26 from surface 16 is about 50 microns, and the voltage on roller 26 is intermediate the voltages of the latent image areas and of the background areas on the photoreceptor surface.

Downstream of roller 26 there is preferably provided a rigidizing roller 30, which is preferably resiliently urged against surface 16; roller 30 is preferably formed of a metal core having a covering of a slightly conductive resilient material, as described, for example, in U.S. Pat. No. 3,959, 574 or U.S. Pat. No. 3,863,603. In a preferred embodiment of the invention, an electrically biased squeegee roller is used as roller 30. Roller 30 is negatively charged to a potential of at least several hundred volts, e.g. up to 2000 volts, generally with the same sign as the charge on the pigmented toner particles, so that it repels similarly charged pigmented particles and causes them to more closely approach the image areas of surface 16, thus compressing and rigidizing the image.

Downstream of rigidizing roller 30 there is provided an intermediate transfer member 40, which rotates in a direction opposite to that of surface 16, as shown in by arrow 41, providing zero relative motion between their respective surfaces at the point of propinquity. Intermediate transfer member 40 is operative for receiving the toner image from surface 16 and for transferring the toner image to a receiving substrate 42, such as paper. Disposed internally of intermediate transfer member 40 there may be provided a heater 46, to heat intermediate transfer member 40. Transfer of the image to intermediate transfer member 40 is preferably aided by providing electrification of intermediate transfer member 40 to a voltage of sign opposite to that of the charged particles, thereby causing transfer by eletrophoresis. Various types of intermediate transfer members are known, and are described, for example, in U.S. Pat. No. 4,684,238, PCT Publication WO 90/04216 and U.S. Pat. No. 4,974,027, the disclosures of all of which are incorporated herein by reference.

Following the transfer of the toner image to intermediate transfer member 40, photoreceptor surface 16 engages a cleaning station 49. This station may be any conventional cleaning station, comprising e.g. cleaning roller 50 which may comprise a suitable resilient material such as foam polyethylene or neoprene. Cleaning roller 50 may be wetted by cleaning lubricating cleaning liquid, which preferably comprises liquid developer from which all or nearly all of the toner particles have been removed. Cleaning roller 50 is driven so that its surface moves oppositely to surface 16 at their nip, to provide scrubbing action for removal of residual particles and carrier liquid from photoreceptor surface 16. A scraper 56 completes the removal of any residual toner which may not have been removed by cleaning station 49. A lamp 58 completes the cycle by removing any residual charge, characteristic of the previous image, from surface 16.

While the invention has been described with regard to imaging systems using intermediate transfer members, liquid toners of the invention can also be advantageously used in systems which provide direct transfer from photoreceptor surface 16 to paper and subsequently fuse the image in a separate fusing station.

While the present invention has been particularly described, persons skilled in the art will appreciate that many variations and modification can be made. Therefore, the invention is not to be construed as restricted to the particularly described embodiments, rather the scope, spirit and concept of the invention will be more readily understood by reference to the claims which follow.

What is claimed is:

1. A liquid toner for use in imaging processes at a given intermediate transfer member temperature from the intermediate transfer member to a substrate, said liquid toner comprising pigmented polymer particles, at least one charge director and a hydrocarbon carrier liquid, wherein the polymer comprised in said particles is a blend of at least two distinct polymer components, the blend being characterized in that in a 40% non-volatile mixture with the carrier liquid, the blend has, on a semi-logarithmic viscosity vs. temperature cooling curve, a transition at a temperature below about 65° C. at a viscosity of between about $3\times10^5$ centipoises and about $5\times10^6$ centipoises, wherein at temperatures below the transition temperature, the rate of change of viscosity with temperature is higher than the rate of change at temperatures above the transition temperature.

2. A liquid toner according to claim 1 wherein at least one polymer component of the polymer particles does not have, in a 40% non-volatile mixture with the carrier liquid, on a semi-logarithmic viscosity vs. temperature cooling curve, a transition at a temperature below about 65° C. at a viscosity of between about $3\times10^5$ centipoises and about $5\times10^6$ centipoises, wherein at temperatures below the transition temperature, the rate of change of viscosity with temperature is higher than the rate of change at temperatures above the transition temperature.

3. A liquid toner according to claim 2 wherein a second polymer component of the polymer particles does not have, in a 40% non-volatile mixture with the carrier liquid, on a semi-logarithmic viscosity vs. temperature cooling curve, a transition at a temperature below about 65° C. at a viscosity of between about $3\times10^5$ centipoises and about $5\times10^6$ centipoises, wherein at temperatures below the transition temperature, the rate of change of viscosity with temperature is higher than the rate of change at temperatures above the transition temperature.

4. An electrostatic imaging process comprising:
forming an image on a first surface utilizing a liquid toner according to claim 3; and
transferring the image to a final substrate and fusing the image thereon.

5. An electrostatic imaging process comprising:
forming an image on a first surface utilizing a liquid toner according to claim 2; and
transferring the image to a final substrate and fusing the image thereon.

6. An electrostatic imaging process comprising:
forming an image on a first surface utilizing a liquid toner according to claim 1; and
transferring the image to a final substrate and fusing the image thereon.

7. A liquid toner for use in imaging processes at a given intermediate transfer member temperature from the intermediate transfer member to a substrate, said liquid toner comprising pigmented polymer particles, at least one charge director and a hydrocarbon carrier liquid, wherein the polymer comprised in said particles is a blend of at least two distinct polymer components, the blend being characterized in that in a 40% non-volatile mixture with the carrier liquid, the blend has, on a semi-logarithmic viscosity vs. temperature cooling curve, a transition at a temperature below about 65° C. at a viscosity of between about $3\times10^5$ centipoises and about $5\times10^6$ centipoises, wherein at temperatures below the transition temperature, the rate of change of viscosity with temperature is higher than the rate of change at temperatures above the transition temperature;

at least a first polymer component of the polymer particles and a second polymer component of the polymer particles do not have, in a 40% non-volatile mixture with the carrier liquid, on a semi-logarithmic viscosity vs. temperature cooling curve, a transition at a temperature below about 65° C. at a viscosity of between about $3\times10^5$ centipoises and about $5\times10^6$ centipoises, wherein at temperatures below the transition temperature, the rate of change of viscosity with temperature is higher than the rate of change at temperatures above the transition temperature; and said first polymer component is an ionomer derived from ethylene/methacrylic acid copolymers and said second polymer component is an ethylene/vinyl acetate/acid terpolymer.

8. A liquid toner according to claim 7 wherein said at least one polymer component is present in a range of 25–80% by weight and said second polymer component is present in a range of 20% to 75% by weight.

9. An electrostatic imaging process comprising:
forming an image on a first surface utilizing a liquid toner according to claim 8; and
transferring the image to a final substrate and fusing the image thereon.

10. An electrostatic imaging process comprising:
forming an image on a first surface utilizing a liquid toner according to claim 7; and
transferring the image to a final substrate and fusing the image thereon.

* * * * *

UNITED STATES PATENT AND TRADEMARK OFFICE
CERTIFICATE OF CORRECTION

| | |
|---|---|
| PATENT NO. | : 6,146,803 |
| DATED | : November 14, 2000 |
| INVENTOR(S) | : B. Landa et al. |

It is certified that error appears in the above-identified patent and that said Letters Patent is hereby corrected as shown below:

Title page,
Item [75] change inventor data to:
-- Benzion Landa, Nes Ziona;
Peretz Ben-Avraham, Rehovot
Becky Bossidan, Rishon Lezion, all of Israel --

Signed and Sealed this

Thirtieth Day of October, 2001

*Attest:*

*Nicholas P. Godici*

NICHOLAS P. GODICI
*Attesting Officer*          *Acting Director of the United States Patent and Trademark Office*